Figure 1:
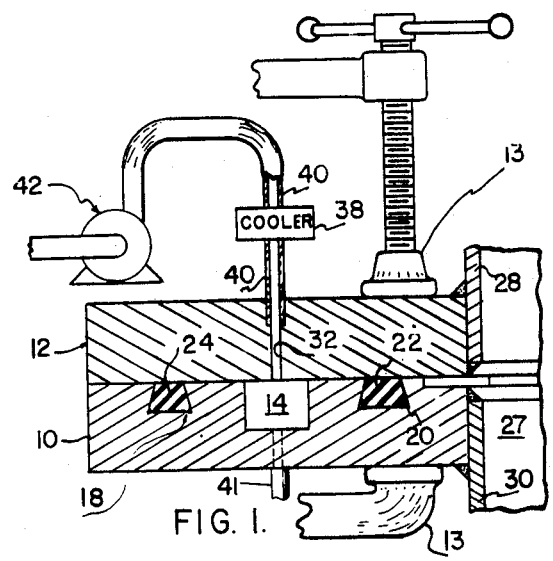

Oct. 16, 1962     I. FARKASS     3,058,232

HIGH VACUUM

Filed Jan. 20, 1960

United States Patent Office 3,058,232
Patented Oct. 16, 1962

3,058,232
HIGH VACUUM
Imre Farkass, Brookline, Mass., assignor to National Research Corporation, Cambridge, Mass., a corporation of Massachusetts
Filed Jan. 20, 1960, Ser. No. 3,674
5 Claims. (Cl. 34—92)

This invention relates to plumbing for high vacuum systems and more particularly for large high vacuum chambers. This application is in part a continuation of my copending application, Serial No. 824,654, filed July 2, 1959.

A principal object of the present invention is to provide a sealing means allowing a very low rate of gas flow into a vacuum chamber between cooperating flanges.

Another object of the invention is to produce a seal for ultra-high vacuum systems including gaskets that conform well to flange surfaces and have long life.

A further object is to provide a dependable high vacuum seal for a vacuum system, which seal is easily produced, maintained, opened and closed.

In the art relating to high vacuum seals, there has been considerable disclosure of O rings and double O rings between substantially flat flanges or flanges having recesses. The present invention is directed to increasing the effectiveness of such seals by decreasing their rate of leakage, rate of outgassing, and, at the same time, providing protection of gaskets in high vacuum systems and high vacuum furnaces from damage due to high temperatures.

The present invention comprises both apparatus and a process for producing high vacuums substantially in the range of $1 \times 10^{-8}$ mm. Hg abs. to the low $10^{-10}$ mm. Hg abs. range. The apparatus is particularly concerned with a flanged connection for joining two portions of an ultra-high vacuum system. The flanged connection preferably comprises a pair of mating flanges and a rubbery sealing gasket positioned between the flanges for sealing the flanges against any in-leakage of gas to the interior of the ultra-high vacuum system. The rubbery gasket is preferably substantially incompressible, although readily deformable. Means are provided for compressing the gasket so that its surfaces can accommodate micro defects in the surface of the metal flanges, and form a vacuum tight seal with these metal surfaces. The flanges are preferably arranged so that a minimum area of the gasket is exposed to the ultra-high vacuum system, and means are provided for cooling the gasket substantially below ambient temperature. In a preferred embodiment, the cooling means are effective to lower the temperature of the gasket below 0° C. With this arrangement, it has been ascertained that the pressure in the high vacuum chamber can be dropped from the low $10^{-9}$ region to the low $10^{-10}$ region. This arrangement thus provides a full order of magnitude of improvement in ultimate vacuum obtainable with a given ultra-high vacuum system. While the exact reason for the outstanding success of the present invention has not been conclusively proven, it is believed to be a function of the outgassing rate of the rubbery elastic material (e.g. neoprene) which is employed as the deformable gasket. At pressures on the order of $1 \times 10^{-8}$, even a minute amount of hydrocarbons escaping from the gasket material can place an enormous volumetric pumping load on the system. By cooling the gasket material, particularly to temperatures below 0° C., this outgassing rate appears to be drastically reduced.

A preferred embodiment of the invention comprises a flange with two recesses and a second flange having a substantially flat surface. The recessed flange is used to retain gaskets which may be composed of rubber, neoprene, polymerized vinyl chloride or related synthetic rubbery elastic materials. At least one of the flanges preferably has a channel or conduit space hollowed out of it. The flanges, when placed in close proximity, thus cooperate with the gaskets and the channel space to provide a conduit for a cooling liquid. When the flanges are placed together, they are preferably designed to provide a heat barrier for at least the inner one of the two rubbery gaskets. This is desirable because the system to be evacuated is preferably heated to remove adsorbed gases retained in the system while it is being evacuated from atmospheric pressure.

The gaskets are preferably neoprene O rings which are located in recesses having a cross-section with the shape of a truncated isosceles triangle.

Figure 2:
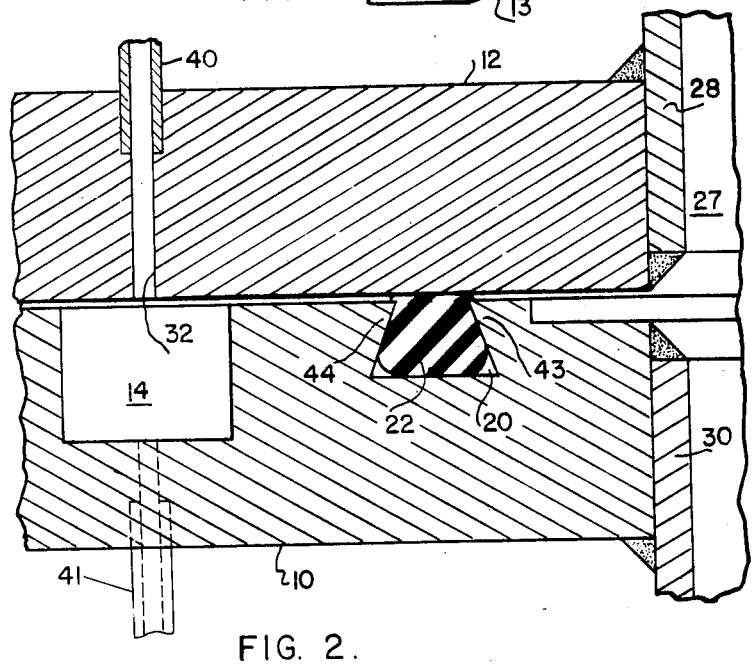

One preferred embodiment of the device is shown in the drawings. FIG. 1 and FIG. 2 are diagrammatic, schematic, sectional views of the device. FIG. 1 shows the apparatus attached to a portion of the chamber wall. FIG. 2 is an enlarged view of the inner gasket of the seal showing the deformation of the gasket under pressure.

In FIG. 1 are shown the walls 28 and 30 which define the high vacuum chamber 27. The pumping system for evacuating the vacuum chamber 27 comprises a conventional pumping system (not shown) such as disclosed in U.S. Patent No. 2,585,139, granted February 12, 1952, and U.S. Patent No. 2,743,168, granted April 24, 1956. The upper flange 12 and lower flange 10 are placed together and held in position by C clamps illustrated at 13. The lower flange 10 is flat except for two recesses 18 and 20 and a channel 14 which has a rectangular cross-section. Placed in recesses 18 and 20 are gaskets 22 and 24. The channel 14 is substantially enclosed by flanges 10 and 12 and gaskets 22 and 24.

Tube 40, cooling means 38 and pump 42 are used for circulation of a cooling liquid through the channel 14. A second tube 41 is connected to the flanges diametrically opposed to the tube 40, the tube 41 being actually illustrated near the tube 40 rather than being displaced 180 degrees. The tubes 40 and 41 thus provide inlets and outlets for circulating liquid sequentially through the cooling means 38 and the channel 14.

The advantage of using certain compositions of neoprene or rubbery elastic gaskets in the system is that suitable types of such rubbery elastic materials have a very low vapor pressure, while being substantially flexible and non-compressible, and thus will conform almost exactly to the surfaces of the two mating flanges. A problem implicit in the use of rubbery gaskets for high vacuum seals is the fact that below $10^{-6}$ mm. Hg abs., the outgassing of the rubber tends to increase the pumpdown time and to limit the lowest pressure obtainable. The present invention is in part aided by the preferred arrangement which decreases the surface area of the gasket exposed to the inner portion of the vacuum system, to decrease such outgassing effect.

In FIG. 2, a preferred embodiment of the apparatus is shown with the outer sealing means omitted. Such sealing means may be any conventional device for retaining fluids under pressure. The deformation of rubbery elastic gasket 22 is shown. Flange portion 43 and flange portion 44 are pressed hard against the gasket by a number of C clamps. This compression increases the internal pressure of gasket 22 and the pressure of the gasket against the facing surfaces of the flanges 10 and 12. As can be seen, the portion 43 of the flange 10 provides the heat barrier mentioned above to protect the gasket during bakeout of the system.

Results obtained by experimentation show the effect of decreasing the temperature of the cooling liquid circulating in channel 14. One particular system is described in the following nonlimiting example:

*Example*

The structure comprised a chamber to be evacuated which had a door flange with a four foot diameter. The door included two standard O ring grooves (see FIG. 1 grooves 18 and 20) having a depth of about .2 inch and sloped with respect to the surface of the flange at about 75°. The inner groove (20) was centered 1¼" from the inner edge of the flange. The O rings were 0.275 diameter neoprene. The flanges had an outer diameter of about 48 inches and an inner diameter of about 42 inches. The flanges were welded to the chamber wall. 24 C clamps were used around the periphery of the mating flanges to press the two flanges together under a high pressure. The chamber to be evacuated had a volume of about 47 cu. ft. and included liquid nitrogen cold traps. The system was outgassed and also pumped down by diffusion pumps utilizing general high vacuum techniques. When the flanges were at room temperature (about 20° C.) the pressure was about $5 \times 10^{-9}$ mm. Hg abs. With cold water (about 10° C.) running through the channel 14, the pressure in the system was about $2 \times 10^{-9}$ mm. Hg abs. With hot water running through the channel 14, the flanges attained a temperature of 54° C. and the pressure in the system rose to about $4 \times 10^{-8}$ mm. Hg abs. When the flange outside temperature was lowered to 7° C. by circulating coolant at 2° C. through the channel, the pressure in the system dropped to $1.4 \times 10^9$ mm. Hg abs. With the inlet coolant temperature at $-38°$ C. and the outlet coolant temperature at $-28°$ C. the pressure in the system dropped to $3.8 \times 10^{-10}$ mm. Hg abs.

In general, the lower the temperature to which the gasket can be reduced, the better will be the ultimate vacuum obtained in the vacuum system, unless the temperature of the rubbery gasket material is lowered to the point where it loses its rubbery properties. For example, if neoprene is cooled to temperatures on the order of $-200°$ C., it is no longer a rubbery, elastic material, but is rather a hard, brittle substance. Obviously, it will not serve its sealing function at such low temperature, even through its outgassing rate may be essentially nil.

While neoprene and polymerized vinyl chloride have been specifically mentioned as materials useful as rubbery gasket materials, numerous others can be employed. The principal requirement is that these materials have a rubbery, elastic property and that they be essentially free of a substantial quantity of volatile plasticizers. Examples of other suitable materials are the various natural rubbers, neoprenes, buna and butyl rubbers, polysulfide rubbers, vinyl resins, copolymers and polyesters. It appears that volumetric incompressibility is highly desirable. Silicone rubbers, which are quite elastic, have been found to be relatively unsuitable, even though they have low vapor pressures, because of the fact that they are subject to volumetric compression. The rubbery elastic materials however are highly deformable while not volumetrically compressible.

The device shown here may be used for any kind of seal when high vacuum is desirable. Its use need not be limited to high vacuum furnaces or high vacuum chambers but may be used for any seal in a high vacuum system. Obviously, there are numerous design features which may be incorporated into the system. The gaskets need not be O rings but may have other shapes, the sole criterion being that such shapes be substantially similar in characteristic (e.g. permeability or outgassing) other than shape to the preferred embodiment; be they round, square, rectangular, oval or triangular in cross section.

The flanges need not be flat but may have curvature and/or discontinuities.

The spirit of the invention is most necessarily related to the apparatus disclosed and the process of cooling the rubbery deformable gaskets to decrease the pressure in the system.

What is claimed is:

1. An ultra-high vacuum system for obtaining a pressure of less than $1 \times 10^{-8}$ mm. Hg abs. comprising a metal chamber, a high vacuum pump for evacuating said chamber, a door for said chamber, a rubbery sealing gasket for sealing said door, means for compressing said gasket, means for cooling a fluid to a temperature below 0° C., and means for circulating the cooled fluid in cooling relationship with said gasket to lower the temperature of said gasket below 0° C.

2. An ultra-high vacuum system for obtaining a pressure of less than $1 \times 10^{-8}$ mm. Hg abs. comprising a metal chamber, a high vacuum pump for evacuating said chamber, a pair of flanges connecting together portions of said system, a rubbery sealing gasket positioned between said flanges for sealing said flanges, means for compressing said gasket, means for cooling a fluid to a temperature below 0° C., and means for circulating the cooled fluid in cooling relationship with said gasket to lower the temperature of said gasket below 0° C.

3. A flanged connection for joining two portions of an ultra-high vacuum system designed to be evacuated to a pressure of less than $1 \times 10^{-8}$ mm. Hg abs., said flanged connection comprising a pair of mating flanges, a rubbery sealing gasket positioned between said flanges for sealing said flanges, means for compressing said gasket, means for cooling a fluid to a temperature below 0° C. and mean for circulating the cooled fluid in cooling relationship with said gasket to lower the temperature of said gasket below 0° C.

4. Apparatus comprising a high vacuum system having two flanges and two gaskets, one of said gaskets being an inner gasket and the other of said gaskets being an outer gasket, said gaskets and flanges enclosing a space wherein liquid is confined, means for circulating said liquid through said space, means for retaining said gaskets in substantially fixed position, said means for retaining the inner gasket being arranged to shield a major portion of the surface area of the inner gasket from said high vacuum system, and means for cooling said liquid to a temperature below 0° C. so that the inner gasket is cooled by said liquid to a temperature below 0° C.

5. Apparatus comprising a seal with two flanges having at least one recess therein and having matching surfaces, a substantially incompressible, deformable, conforming inner gasket retained in said recess, and cooperating means comprising said inner gasket, said flanges, and an outer sealing means enclosing a channel space wherein liquid may be circulated, and means providing a heat barrier for protecting said inner gasket, means for compressing said gasket in said recess, and means for cooling said liquid to a temperature below 0° C., said channel being arranged so that said cold liquid, when circulated through the channel, is able to cool the inner gasket to a temperature below 0° C.

References Cited in the file of this patent
UNITED STATES PATENTS

| 2,417,361 | Herzog | Mar. 11, 1947 |
| 2,757,840 | Weissenberg et al. | Aug. 7, 1956 |
| 2,856,697 | Fruth | Oct. 21, 1958 |
| 2,930,139 | Brynko et al. | Mar. 29, 1960 |

FOREIGN PATENTS

| 32,584 | Norway | June 27, 1921 |
| 736,894 | Great Britain | Sept. 14, 1955 |